United States Patent
Sheridan et al.

(10) Patent No.: US 9,124,449 B2
(45) Date of Patent: Sep. 1, 2015

(54) NETWORK TOPOLOGIES FOR ENERGY EFFICIENT NETWORKS

(75) Inventors: Alan Patrick Sheridan, Raleigh, NC (US); Alvaro Retana, Raleigh, NC (US); Russell I. White, Holly Springs, NC (US)

(73) Assignee: Cisco Technology, Inc., San Jose, CA (US)

(*) Notice: Subject to any disclaimer, the term of this patent is extended or adjusted under 35 U.S.C. 154(b) by 143 days.

(21) Appl. No.: 13/019,136

(22) Filed: Feb. 1, 2011

(65) Prior Publication Data
US 2012/0198092 A1   Aug. 2, 2012

(51) Int. Cl.
| G06F 15/173 | (2006.01) |
| H04L 12/64 | (2006.01) |
| H04L 12/751 | (2013.01) |
| H04M 15/00 | (2006.01) |

(52) U.S. Cl.
CPC ............ *H04L 12/6418* (2013.01); *H04L 45/02* (2013.01); *H04M 15/8044* (2013.01)

(58) Field of Classification Search
CPC . H04L 12/1485; H04L 45/02; H04M 15/8044
USPC .......... 709/230–242; 710/11, 38; 340/2.1–2.8
See application file for complete search history.

(56) References Cited

U.S. PATENT DOCUMENTS

| 5,682,479 | A  | * | 10/1997 | Newhall et al. ............... 709/242 |
| 6,363,319 | B1 | * | 3/2002  | Hsu .............................. 701/533 |
| 6,600,722 | B1 | * | 7/2003  | Tran et al. ...................... 370/238 |
| 6,625,124 | B1 | * | 9/2003  | Fan et al. ....................... 370/235 |
| 8,553,560 | B2 | * | 10/2013 | Axelsson et al. .............. 370/238 |
| 2002/0013856 | A1 | * | 1/2002 | Garcia-Luna-Aceves et al. ............................ 709/238 |
| 2002/0133589 | A1 | * | 9/2002 | Gubbi et al. ................... 709/225 |
| 2006/0153081 | A1 | * | 7/2006 | Simonsson et al. ........... 370/238 |
| 2007/0070983 | A1 | * | 3/2007 | Redi et al. ...................... 370/352 |
| 2007/0248067 | A1 | * | 10/2007 | Banerjea et al. .............. 370/338 |
| 2008/0031250 | A1 | * | 2/2008 | Mehta et al. ................... 370/392 |
| 2009/0116511 | A1 | * | 5/2009 | Anderson et al. ............. 370/468 |
| 2012/0198092 | A1 | * | 8/2012 | Sheridan et al. .............. 709/241 |

OTHER PUBLICATIONS

U.S. Appl. No. 13/019,157, filed Feb. 1, 2011, Retana.
Alvaro E. Retana, et al., U.S. Appl. No. 13/019,157, Notice of Allowance dated Dec. 6, 2013.

* cited by examiner

*Primary Examiner* — Lisa Lewis
*Assistant Examiner* — Lizbeth Torres-Diaz
(74) *Attorney, Agent, or Firm* — Baker Botts, L.L.P.

(57) ABSTRACT

One embodiment receives at a first node in at least a portion of a network a routing table, the portion of the network comprising the first node and one or more second nodes, the routing table specifying the immediate neighbor that provides each of the best paths in the portion of the network based on a total cost; using the routing table, determines at the first node every second node that is necessary for the first node to reach all edges of the network, the second nodes that are necessary for the first node to reach all edges of the network comprising an active set for the first node; and sends a message from the first node to every second node to facilitate determining whether to shut down the second node.

15 Claims, 3 Drawing Sheets

… (US 9,124,449 B2)

NETWORK TOPOLOGIES FOR ENERGY EFFICIENT NETWORKS

TECHNICAL FIELD

This disclosure generally relates to network topologies and more specifically relates to creating network topologies that reduce energy consumption throughout computer networks.

BACKGROUND

Energy efficiency is a popular concept in the modern era, especially among people who are conscious of environmental issues. Reducing energy consumption in computer networks brings about many benefits, the least of which including reducing operation costs and saving energy and thus the environment.

To ensure performance quality, computer networks, especially large networks such as those associated with data centers or large institutions, often include a great number of routers and contain a high amount of coupling and redundancy between these routers in order to provide fast data transfer and recovery rates. Consequently, the largest energy consumption in a computer network is often in the individual routers, such as the energy required to maintain, process, and operate each router. In comparison, the energy required to actually transfer data over a computer network is relatively insignificant.

Network usage typically varies depending on the time of the day or the day of the week. For example, at nights or on weekends, network usage is often low because less people are working. And yet, the routers are kept running at all hours and thus consume large amounts of energy even when their usage is low. Energy is needlessly wasted as a result.

DESCRIPTION OF EXAMPLE EMBODIMENTS

Often, the largest energy consumption in a computer network is in the individual routers. Therefore, by eliminating unnecessary routers from a network, large amounts of energy may be saved over time. One way to eliminate unnecessary routers from a computer network is through network topology reduction. Many forms of topology reduction, such as Dijkstra's algorithm, mid-sum routes, DFS numbering, and min-metric, have been implemented and used over time. However, the existing forms of topology reduction usually require full knowledge of the topology of a network, or focus on eliminating only unnecessary connections between routers instead of eliminating unnecessary router nodes throughout the network.

Particular embodiments take into account the energy consumption of the individual nodes (e.g., routers) in a computer network in order to design minimal topologies for the computer network so that during periods of low network usage or downtime, large amounts of energy may be saved. Particular embodiments utilize a protocol-independent algorithm to dynamically determine minimal topologies for computer networks. In particular embodiments, the algorithm is protocol independent because it is not necessary for each node in a network to have any knowledge of the full topology of the network. In particular embodiments, the algorithm not only optimizes energy usage in a network, but maintains a performance standard in order to guarantee that the network does not lose its ability to perform the necessary tasks.

Figure 1:
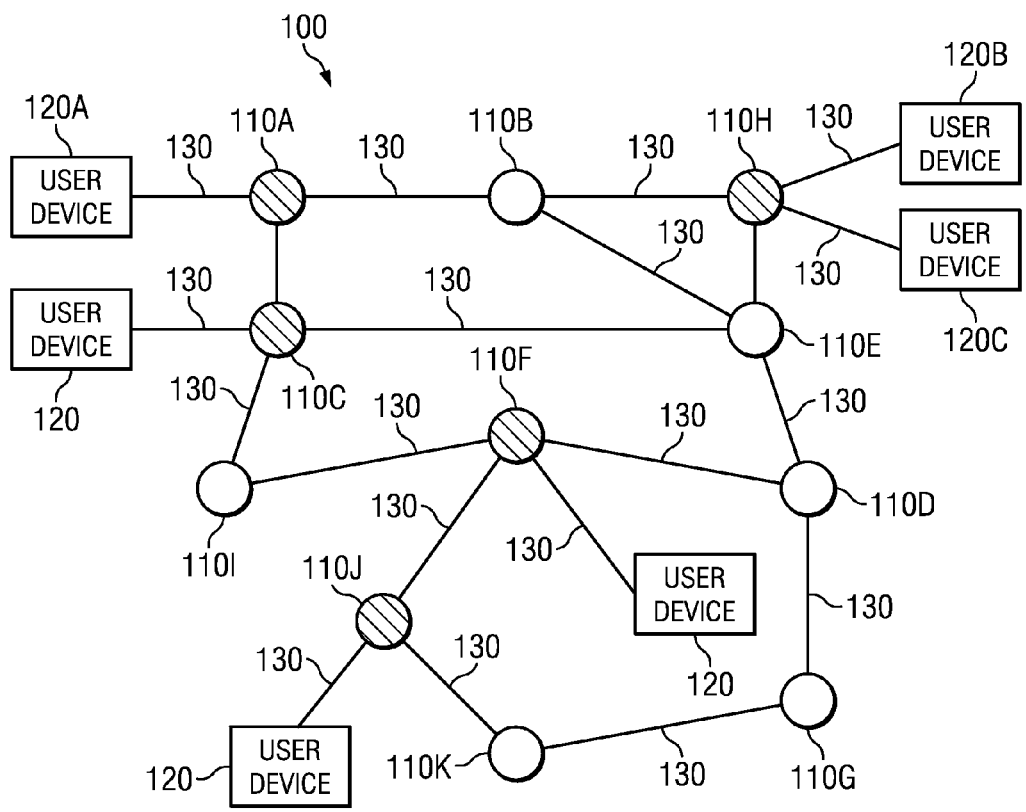
FIG. 1 illustrates an example computer network that includes an arbitrary number of nodes.

FIG. 1 illustrates an example computer network 100 that includes an arbitrary number of nodes 110. For example, a node 110 may be a router. Two nodes 110 may be connected with a link 130 (e.g., a communications link). Note that only a small number of nodes and connections are illustrated in FIG. 1 as an example, and in practice, a computer network may include any number of nodes connected according to any suitable topology. In particular embodiments, each node 110 may include hardware, software, or embedded logic components or a combination of two or more such components capable of carrying out the appropriate functionalities implemented or supported by such a node. In particular embodiments, each node 110 may have an identifier and a power or energy consumption value; and each link 130 between two nodes may have a bandwidth. In particular embodiments, the identifier of each node 110 may be unique within network 100. In particular embodiments, the power consumption value of each node 110 is its energy cost and is measured by a power-consumption metric determined based on the type and configuration of the node 110.

In particular embodiments, a node 110 in network 100 may be directly connected with one or more other nodes 110. For example, in FIG. 1, node 110A is directly connected with nodes 110B and 110C; node 110D is directly connected with nodes 110E, 110F, and 110G; and node 110G is directly connected with nodes 110D and 110K. In particular embodiments, a node 110 may be directly connected with one or more user devices 120, such as personal computers, tablets, smart telephones, or game devices. For example, in FIG. 1, node 110A is directly connected with user device 120A, while node 110H is directly connected with user devices 120B and 120C. In particular embodiments, two components (e.g., two nodes or a node and a user device) are directly connected when there is a direct link with no other component between them. Thus, node 110A is directly connected to node 110B, but is not directly connected to node 110E because there is no direct link between nodes 110A and 110E.

In particular embodiments, if a node is directly connected with one or more user devices, it is referred to as an "edge node" (e.g., an edge router). In particular embodiments, when determining a minimal topology for a network, all edge nodes in the network are kept alive and online at all times.

Each node 110 has a first-hop neighborhood (also referred to as a one-hop neighborhood) and a second-hop neighborhood (also referred to as a two-hop neighborhood). For each node 110, its first-hop neighborhood includes all the other nodes that are directly connected with the node 110—all the other nodes that are one hop from node 110. For example, in FIG. 1, the first-hop neighborhood of node 110A includes nodes 110B and 110C, while the first-hop neighborhood of node 110E includes nodes 110B, 110C, 110D, and 110H. For each node 110, its second-hop neighborhood includes all the other nodes that are directly connected with any node in the first-hop neighborhood of the node 110—all the other nodes that are two hops from node 110. In other words, for each node 110, its second-hop neighborhood includes all the other nodes that are connected with the node 110 via only one other node. For example, in FIG. 1, the second-hop neighborhood of node 110A includes nodes 110E, 110H, and 110I, while the second-hop neighborhood of node 110G includes nodes 110E, 110F, and 110J. Node 110I connects with node 110A via only node 110C, and node 110C is in the first-hop neighborhood of node 110A. Similarly, node 110E connects with node 110A via only node 110B along one path or via only node 110C along another path, and both nodes 110B and 110C are in the first-hop neighborhood of node 110A. Note that as these examples illustrate, the first-hop and second-hop neighborhoods are determined with respect to each specific node 110, and the first-hop and second-hop neighborhoods of one node may differ from the first-hop and second-hop neighborhoods of another node. In addition, it is possible that a node may not have any second-hop neighbors (e.g., when there are only a few nodes in the network). Furthermore, in particular embodiments, if a first node is connected with a second node via multiple paths, then the shortest path between the first node and the second node is used to determine how many hops there are between the two nodes. Thus, for example, if the first node is directly connected with the second node on the one hand (one hop) and connected with the second node via a third node on the other hand (two hops), the first node and second node are considered one-hop neighbors to each other.

Between any two nodes 110, there may be one or more paths. For example, in FIG. 1, from node 110A to node 110C, a first path may go from node 110A directly to node 110C; a second path may go from node 110A to node 110B to node 110E to node 110C; and a third path may go from node 110A to node 110B to node 110H to node 110E to node 110C. Of course, the first path is shorter and thus generally more preferable than the second path, which is in turn shorter than the third path. In particular embodiments, each path between two nodes 110 may be associated with a cost, which may be the cost involved in transferring data from one node 110 to the other node 110 along this path. Particular embodiments may determine the cost of each path based on various factors, such as, for example and without limitation, the total number of nodes along the path, the cost of operating the individual nodes, the cost of maintaining the connections between the nodes, the time it takes to transfer the data, and the delay along the path.

In particular embodiments, there may be a protocol cost associated with traveling between the nodes (e.g., routers). In particular embodiments, the protocol cost is native to and determined based on the routing protocol running by the nodes. Different routing protocols may result in different protocol costs. For example, the protocol cost may be determined as Protocol Cost=K/bandwidth+delay, where the term K represents a constant.

In particular embodiments, when determining a minimal topology for a computer network for the purpose of reducing power consumption, the algorithm used to determine the minimal topology may take into consideration any number of constraints or requirements, such as performance requirements for the network formed according to the resulting topology.

In particular embodiments, one constraint may be a "baseline bandwidth" (also referred to as "minimum bandwidth"), which is the minimum bandwidth that needs to be maintained across the network formed according to the resulting topology. In particular embodiments, the baseline bandwidth may be represented as various metrics, such as, for example and without limitation, delays and transfer rates. In particular embodiments, the baseline bandwidth may be specified by a human user or determined based on system performance requirements. When determining a minimal topology for a network, particular embodiments determine an active set of nodes for each node in the network (described in more detail below in connection with FIG. 3). The active set of nodes of a specific node includes a minimum set of one-hop neighbors of that specific node that is necessary to support the baseline bandwidth requirement.

In particular embodiments, the baseline bandwidth may be presented as a metric that defines a profile for bandwidth requirements of different areas (e.g., access, distribution, or core) of the network. In particular embodiments, this metric may be specified by a human user (e.g., a network administrator) and supplied to the algorithm used to determine a minimal topology for a network as an input.

Figure 2:
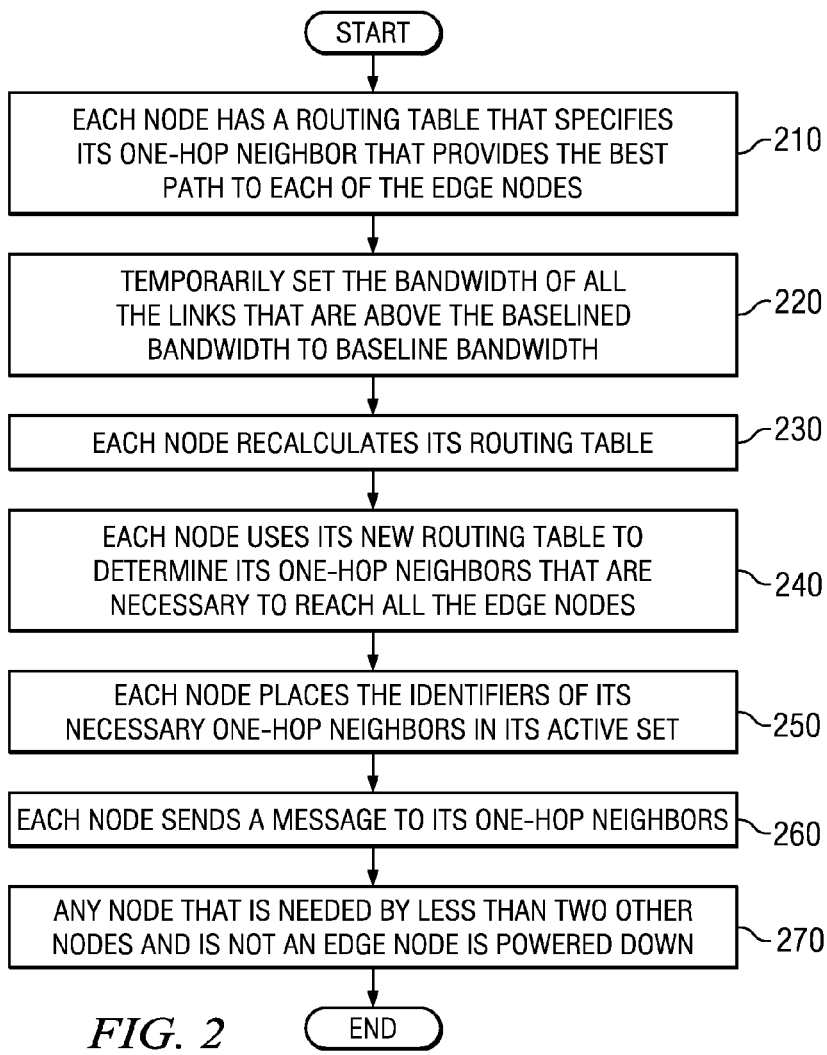
FIG. 2 illustrates an example method for determining a minimal topology for a computer network in order to reduce power consumption throughout the network.
Figure 3:
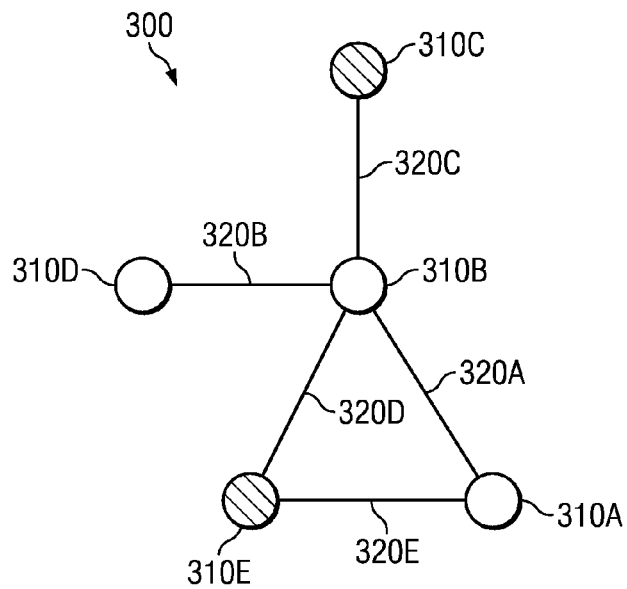
FIG. 3 illustrates an example computer network.

FIG. 2 illustrates an example method for determining a topology for a computer network in order to reduce power consumption throughout the network. In particular embodiments, specific steps illustrated in FIG. 2 are similarly performed with respect to each and every node in a network. For purpose of clarification, let the specific node in connection with which a step is performed be referred to as the "current node". In addition, FIG. 3 illustrates a simplified network 300 that includes five nodes 310A-310E connected by five links 320A-320E. Suppose that, for this example, nodes 310C and 310E are edge nodes—nodes that are directly connected with user devices. The steps illustrated in FIG. 2 are explained using network 300 as an example.

In particular embodiments, each node in the network has an identifier and a power consumption value, and each link between two nodes has a bandwidth. In particular embodiments, the node identifiers may be numbers, alphabets, or a combination thereof. For purpose of clarification, let ID denote the identifier of a node, PC denote the power consumption value of a node, and BW denote the bandwidth of a link. Furthermore, let $BW_{base}$ denote the baseline bandwidth. Particular embodiments assume that each node is aware of its immediate, one-hop neighbors and that a baseline bandwidth $BW_{base}$ has been specified.

In particular embodiments, each node in the network has a routing table that specifies its one-hop neighbor that provides the best path to each of the edge nodes, as illustrated in STEP 210. A node may already has such a routing table, in which case the node may simply use the existing table. If a node does not have such a routing table, in particular embodiments, the node may determine the routing table for itself.

In particular embodiments, there may be one or more paths connecting a current node and a specific edge node. If there is only one path, then this path is the best path for the current node to reach the specific edge node, as there is no other choice. Thus, the immediate, one-hop neighbor of the current node along this path is specified in the routing table of the current node in connection with this path. On the other hand, if there are multiple paths, then, in particular embodiments, the path with the lowest cost may be selected as the best path. In particular embodiments, the cost of a path may be measured as the routing cost of the path (e.g., the cost, including, for example, energy cost, protocol cost, etc., required to transfer data along the path from the current node to the specific edge node). Thus, the path that has the lowest routing cost between the current node and the specific edge node may be selected as the best path. The immediate, one-hop neighbor of the current node along this best path is specified in the routing table of the current node in connection with this path.

For the current node, there is a best path leading to each of the edge nodes, and thus, a one-hop neighbor is specified in the routing table of the current node in connection with each best path. In addition, the same one-hop neighbor of the current node may be on more than one best paths leading to more than one edge nodes. In this case, in particular embodiments, the same one-hop neighbor of the current node may be specified in the routing table of the current node in connection with multiple best paths leading to multiple edge nodes.

For example, in FIG. 3, suppose node 310A is selected as the current node. There are two edge nodes 310C and 310E. Between nodes 310A and 310E, there are two paths: (1) from node 310A directly to node 310E; and (2) from node 310A to node 310B to node 310E. It is most likely that the first path (from node 310A directly to node 310E) is the best path in terms of routing cost as it is the shortest, most direct path among the two possible paths. For this path between nodes 310A and 310E, node 310E is the one-hop neighbor of node 310A along the path; thus, node 310E is included in the routing table of node 310A for this path.

Between node 310A and 310C, there are also two paths: (1) from node 310A to node 310B to node 310C; and (2) from node 310A to node 310E to node 310B to node 310C. Again, the first path (from node 310A to node 310B to node 310C) is most likely to be the best path in terms of routing cost as it is the shortest path among the two paths. For this path between nodes 310A and 310C, node 310B is the one-hop neighbor of node 310A along the path; thus, node 310B is included in the routing table of node 310A for this path.

As another example, suppose node 310D is selected as the current node. Between nodes 310D and 310C, there is only one path: from node 310D to node 310B to node 310C. In this case, the only path is the best path, and node 310B is the one-hop neighbor of node 310D along this path. Between nodes 310D and 310E, there are two paths: (1) from node 310D to node 310B to node 310E; and (2) from node 310D to node 310B to node 310A to node 310E. In this case, the first path is the best path as it is a shorter of the two paths. Again, node 310B is the one-hop neighbor of node 310D along this path. For the best paths to both edge nodes, node 310B is the one-hop neighbor of node 310D on the paths. Thus, node 310B is included in the routing table of node 310D for both of the best paths to both edge nodes.

As explained above, each link between two nodes has a bandwidth. Particular embodiments temporarily set the bandwidths of all those links having bandwidths greater than the baseline bandwidth $BW_{base}$ to the baseline bandwidth $BW_{base}$, as illustrated in STEP 220. Note that this is for the purpose of computation only, and the bandwidths of these links are returned to their actual bandwidths after the computation is completed.

In particular embodiments, each node recalculates its routing table, as illustrated in STEP 230. In particular embodiments, when each node recalculates its routing table, the temporary bandwidths of the links are used. In particular embodiments, each node re-determines the best path to each of the edge nodes by re-computing the cost of each path between the node and a specific edge node. Again, in particular embodiments, this cost may be the routing cost of each path.

In particular embodiments, the cost of a specified path between a current node and a specific edge node may be computed as: (1) if the bandwidth of the path is less than the baseline bandwidth $BW_{base}$, then Cost=Protocol Cost+Energy Cost*C+MAX_METRIC/2; and (2) if the bandwidth of the path is greater than or equal to baseline bandwidth $BW_{base}$, then Cost=Protocol Cost+Energy Cost*C. In particular embodiment, the term C represents a scaling function. In particular embodiments, the term C may be a function of energy, such as C=F(energy)=c*energy, where the term c is a scaling factor (e.g., a constant specified, for example, by a human user) that may be used to scale energy with bandwidth of the path. In particular embodiments, the term MAX_METRIC may be an arbitrary number representing the highest value attainable in a certain number of system. Note that as illustrated above, in particular embodiments, the amount MAX_METRIC/2 is added to the result Cost only when the bandwidth of the path is less than the baseline bandwidth $BW_{base}$. The purpose is to add a large number to the result Cost to ensure that a path having a bandwidth below the baseline bandwidth $BW_{base}$ is not chosen before a path having a bandwidth that satisfies (above) the baseline bandwidth $BW_{base}$.

In particular embodiments, once the new cost has been computed for each path, each node may update its routing table using the newly computed costs of the paths. As described above, for a current node, the current node may select the best path to each of the edge nodes using the newly computed cost for each path. In particular embodiments, again, the path connecting the current node and a specific edge node that has the lowest cost (recomputed cost) may be selected as the best path between the current node and that specific edge node. In particular embodiments, the first-hop neighbor on the selected best path for each edge node is included in the routing table of the current node for that path.

In particular embodiments, each node uses its updated routing table to determine every one of its one-hop neighbor through which the node is able to reach one or more edge nodes. Using this information, each node may obtain a list of its one-hop neighbors that are necessary for the node to reach all of the edge nodes, as illustrated in STEP 240. For example, a specific one-hop neighbor of a current node is necessary to the current node if it is on a path between the current node and an edge node.

In particular embodiments, each node places its list of necessary one-hop neighbors in the active set of the node, as illustrated in STEP 250. For example, a current node may includes in its active set the identifiers of its one-hope neighbors that are necessary for the current node to reach all of the edge nodes. In particular embodiments, any node that is not included in the active set of a node is considered unnecessary.

In particular embodiments, each node may send a message (e.g., a "hello" message) to each of its one-hop neighbors, as illustrated in STEP 260. In particular embodiments, for each node, the message sent to each of its one-hop neighbors may include a list of all the unnecessary one-hop neighbors of the node that are not included in the active set of the node. In particular embodiments, with respect to a current node, each of the one-hop neighbors of the current node may use the list to determine whether itself is necessary (e.g., not on the list of the unnecessary neighbors received from the current node) or unnecessary (e.g., on the list of the unnecessary neighbors received from the current node). In particular embodiments, those one-hop neighbors of the current node that are on the list of the unnecessary neighbors may power themselves down to reduce energy consumption throughout the network.

In particular embodiments, any node that is needed by less than two other nodes and is not an edge node may be powered down to reduce energy consumption in the network, as illustrated in STEP 270. In particular embodiments, a first node is needed by a second node if the first node is on one of the selected paths (e.g., one of the best paths) that connects the second node with an edge node.

At this point, the remaining nodes that are still alive form a minimal topology for the computer network that reduces power consumption while satisfying the baseline-bandwidth requirement. Topologies may be dynamically determined for a network using the method illustrated in FIG. 2. For example, different topology profiles may be constructed for different times of the day (e.g., morning, afternoon, evening, or night)

or different days of the week (e.g., weekdays and weekends). For each topology profile, a user may specify the appropriate baseline bandwidth and minimum number of paths, so that the network may be optimized based on different metrics under different circumstances.

Figure 4:
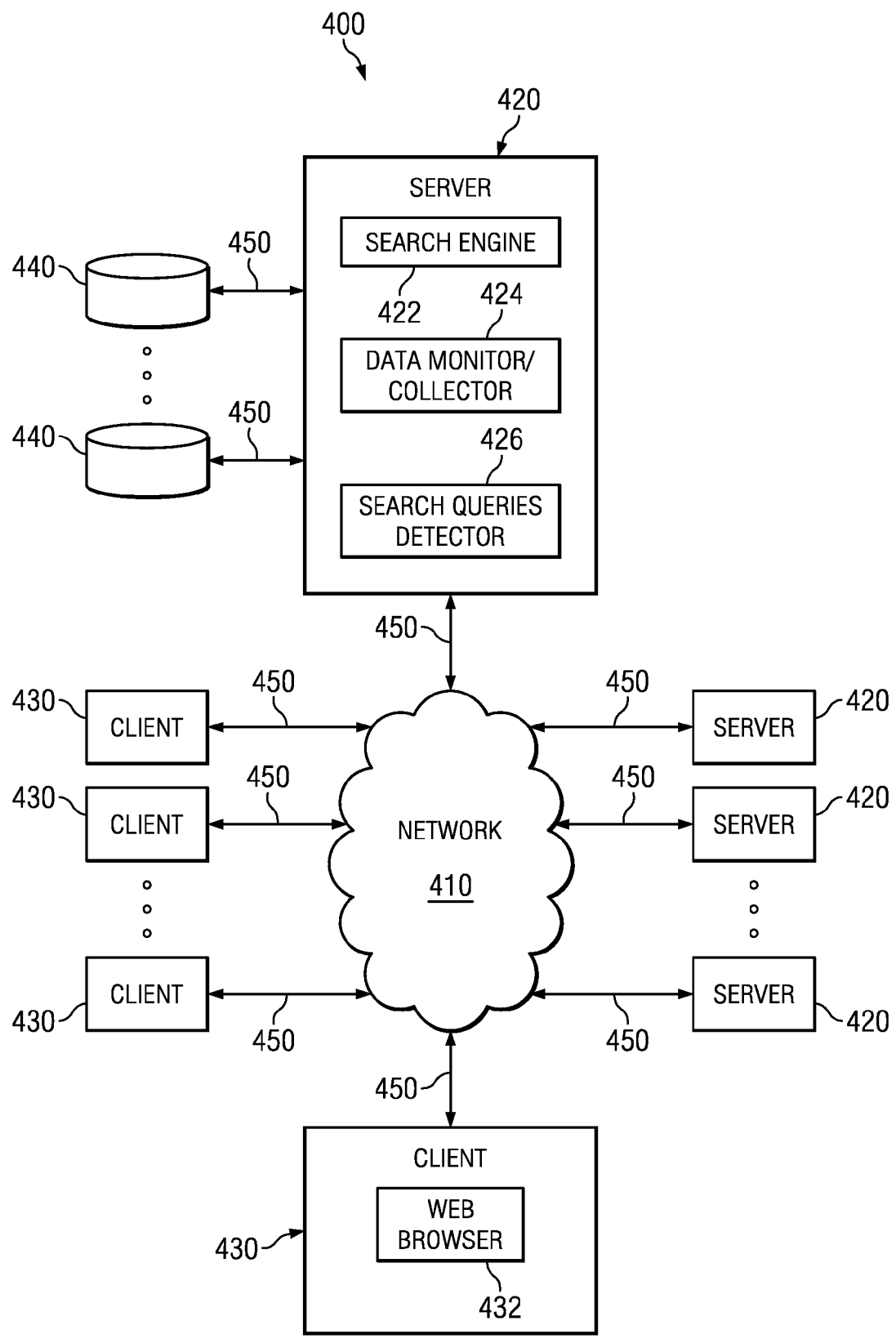
FIG. 4 illustrates an example network environment.

Particular embodiments may be implemented in a network environment. FIG. 4 illustrates an example network environment 400 suitable for providing software validation as a service. Network environment 400 includes a network 410 coupling one or more servers 420 and one or more clients 430 to each other. In particular embodiments, network 410 is an intranet, an extranet, a virtual private network (VPN), a local area network (LAN), a wireless LAN (WLAN), a wide area network (WAN), a metropolitan area network (MAN), a portion of the Internet, or another network 410 or a combination of two or more such networks 410. This disclosure contemplates any suitable network 410.

One or more links 450 couple a server 420 or a client 430 to network 410. In particular embodiments, one or more links 450 each includes one or more wireline, wireless, or optical links 450. In particular embodiments, one or more links 450 each includes an intranet, an extranet, a VPN, a LAN, a WLAN, a WAN, a MAN, a portion of the Internet, or another link 450 or a combination of two or more such links 450. This disclosure contemplates any suitable links 450 coupling servers 420 and clients 430 to network 410.

In particular embodiments, each server 420 may be a unitary server or may be a distributed server spanning multiple computers or multiple datacenters. Servers 420 may be of various types, such as, for example and without limitation, web server, news server, mail server, message server, advertising server, file server, application server, exchange server, database server, or proxy server. In particular embodiments, each server 420 may include hardware, software, or embedded logic components or a combination of two or more such components for carrying out the appropriate functionalities implemented or supported by server 420. For example, a web server is generally capable of hosting websites containing web pages or particular elements of web pages. More specifically, a web server may host HTML files or other file types, or may dynamically create or constitute files upon a request, and communicate them to clients 430 in response to HTTP or other requests from clients 430. A mail server is generally capable of providing electronic mail services to various clients 430. A database server is generally capable of providing an interface for managing data stored in one or more data stores.

In particular embodiments, one or more data storages 440 may be communicatively linked to one or more severs 420 via one or more links 450. In particular embodiments, data storages 440 may be used to store various types of information. In particular embodiments, the information stored in data storages 440 may be organized according to specific data structures. In particular embodiment, each data storage 440 may be a relational database. Particular embodiments may provide interfaces that enable servers 420 or clients 430 to manage, e.g., retrieve, modify, add, or delete, the information stored in data storage 440.

In particular embodiments, each client 430 may be an electronic device including hardware, software, or embedded logic components or a combination of two or more such components and capable of carrying out the appropriate functionalities implemented or supported by client 430. For example and without limitation, a client 430 may be a desktop computer system, a notebook computer system, a netbook computer system, a handheld electronic device, or a mobile telephone. This disclosure contemplates any suitable clients 430. A client 430 may enable a network user at client 430 to access network 430. A client 430 may enable its user to communicate with other users at other clients 430.

A client 430 may have a web browser 432, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 430 may enter a Uniform Resource Locator (URL) or other address directing the web browser 432 to a server 420, and the web browser 432 may generate a Hyper Text Transfer Protocol (HTTP) request and communicate the HTTP request to server 420. Server 420 may accept the HTTP request and communicate to client 430 one or more Hyper Text Markup Language (HTML) files responsive to the HTTP request. Client 430 may render a web page based on the HTML files from server 420 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 5:
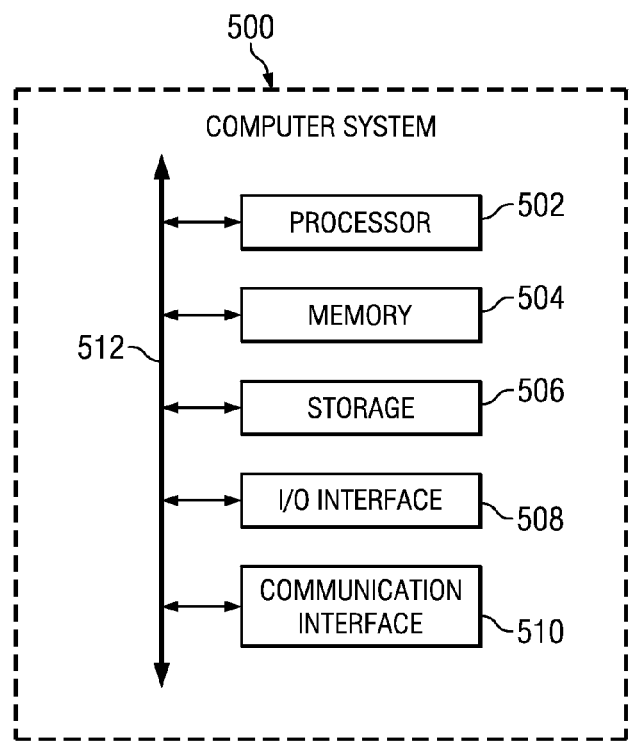
FIG. 5 illustrates an example computer system

Particular embodiments may be implemented on one or more computer systems. FIG. 5 illustrates an example computer system 500. For example, system 500 may be a node (e.g., a router) in a network (e.g., network 400). In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 500; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include an HDD, a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 502 (such as, for example, one or more internal registers or caches), one or more portions of memory 504, one or more portions of storage 506, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What claimed is:

1. A method comprising, by one or more computer systems:
   accessing a routing table of at least a portion of a network that uses a routing protocol;
   accessing a profile that specifies a minimum bandwidth required to maintain a connection across the portion of the network;
   setting a bandwidth of every connection in the portion of the network having bandwidth above the minimum bandwidth to the minimum bandwidth;

13 for every connection in the portion of the network, dynamically determining a minimal topology of the portion of the network by:

calculating a total cost that comprises:

if a bandwidth of the connection is less than the minimum bandwidth, then a sum of a protocol cost, a scaled energy cost, and a first constant; and if a bandwidth of the connection is equal to the minimum bandwidth, then a sum of the protocol cost and the scaled energy cost;

the protocol cost being a routing cost associated with communicating along the connection that is native to the routing protocol; and the scaled energy cost based on a router type and a configuration associated with the connection; and assigning the total cost to the connection in the routing table;

for each active path in the portion of the network, selecting a best path based on the total costs of the connections in the active path;

updating the routing table to include only the best paths in the portion of the network; and communicating the routing table as updated to one or more nodes in the portion of the network.

2. The method of claim 1, wherein the first constant is such that a connection having bandwidth less than the minimum bandwidth is not selected before a connection having bandwidth greater than the minimum bandwidth.

3. The method of claim 1, wherein the scaled energy cost is an energy cost multiplied by a predetermined constant.

4. The method of claim 1, wherein the connections are between routers and the nodes are routers.

5. The method of claim 1, wherein the portion of the network is an access, distribution, or core area of the network.

6. An apparatus comprising:

a memory comprising instructions executable by one or more processors; and the one or more processors coupled to the memory and operable to execute the instructions, the one or more processors being operable when executing the instructions to:

access a routing table of at least a portion of a network that uses a routing protocol;

access a profile that specifies a minimum bandwidth required to maintain a connection across the portion of the network;

set a bandwidth of every connection in the portion of the network having bandwidth above the minimum bandwidth to the minimum bandwidth;

for every connection in the portion of the network, dynamically determining a minimal topology of the portion of the network by:

calculating a total cost that comprises:

if a bandwidth of the connection is less than the minimum bandwidth, then a sum of a protocol cost, a scaled energy cost, and a first constant; and if a bandwidth of the connection is equal to the minimum bandwidth, then a sum of the protocol cost and the scaled energy cost;

the protocol cost being a routing cost associated with communicating along the connection that is native to the routing protocol; and the scaled energy cost based on a router type and a configuration associated with the connection; and

14 assigning the total cost to the connection in the routing table;

for each active path in the portion of the network, selecting a best path based on the total costs of the connections in the active path;

update the routing table to include only the best paths in the portion of the network; and communicate the routing table as updated to one or more nodes in the portion of the network.

7. The apparatus of claim 6, wherein the first constant is such that a connection having bandwidth less than the minimum bandwidth is not selected before a connection having bandwidth greater than the minimum bandwidth.

8. The apparatus of claim 6, wherein the scaled energy cost is an energy cost multiplied by a predetermined constant.

9. The apparatus of claim 6, wherein the connections are between routers and the nodes are routers.

10. The apparatus of claim 6, wherein the portion of the network is an access, distribution, or core area of the network.

11. One or more computer-readable non-transitory storage media embodying software operable when executed by one or more computer systems to:

access a routing table of at least a portion of a network that uses a routing protocol; access a profile that specifies a minimum bandwidth required to maintain a connection across the portion of the network;

set a bandwidth of every connection in the portion of the network having bandwidth above the minimum bandwidth to the minimum bandwidth;

for every connection in the portion of the network, dynamically determine a minimal topology of the portion of the network by:

calculating a total cost that comprises:

if a bandwidth of the connection is less than the minimum bandwidth, then a sum of a protocol cost, a scaled energy cost, and a first constant; and if a bandwidth of the connection is equal to the minimum bandwidth, then a sum of the protocol cost and the scaled energy cost;

the protocol cost being a routing cost associated with communicating along the connection that is native to the routing protocol; and the scaled energy cost based on a router type and a configuration associated with the connection; and assigning the total cost to the connection in the routing table;

for each active path in the portion of the network, selecting a best path based on the total costs of the connections in the active path;

update the routing table to include only the best paths in the portion of the network; and communicate the routing table as updated to one or more nodes in the portion of the network.

12. The media of claim 11, wherein the first constant is such that a connection having bandwidth less than the minimum bandwidth is not selected before a connection having bandwidth greater than the minimum bandwidth.

13. The media of claim 11, wherein the scaled energy cost is an energy cost multiplied by a predetermined constant.

14. The media of claim 11, wherein the connections are between routers and the nodes are routers.

15. The media of claim 11, wherein the portion of the network is an access, distribution, or core area of the network.

* * * * *